United States Patent Office 3,418,349

Patented Dec. 24, 1968

1

2

3,418,349

METHOD OF PREPARING DIBUTYL TIN MALEATE

Vincent Oakes, Eccleston, St. Helens, England, assignor to Pure Chemicals Limited, Liverpool, England, a British company No Drawing. Filed Aug. 30, 1965, Ser. No. 483,815

1 Claim. (Cl. 260—429.7)

ABSTRACT OF THE DISCLOSURE

A method of producing dialkyl tin salts of dicarboxylic acid comprises grinding together a dialkyl tin oxide and an acid anhydride, the mixture if desired being heated to a temperature not exceeding 40° C.

This invention relates to the production of dialkyl tin salts of organic acids.

According to the invention, dialkyl tin salts of organic acids are obtained by grinding together a dialkyl tin oxide and an acid anhydride, preferably in equimolar proportions.

The invention is applicable to the production of dibutyl tin maleate from dibutyl tin oxide and maleic anhydride which are ground together in equimolar proportions. The product obtained has a definite melting point of 134° C., whereas a mixture of dibutyl tin oxide and maleic anhydride has no sharply defined melting point, but softens over a range of temperatures, finally becoming liquid at about 200° C.

The reaction between the materials is assisted by the small amount of heat which is generated during the grinding process, and it may be further assisted by giving the mixture a further heating for a period of up to 24 hours at temperatures up to 40° C. Higher temperatures may be used for a shorter period, but then the mixture fuses together. At a temperature of about 40° C. no fusing occurs and the product is available for immediate use.

The invention is applicable to other dialkyl tin oxides, and to other acid anhydrides, e.g., succinic anhydride and phthalic anhydride.

If desired an excess of acid anhydride over the equimolar proportion may be used. This excess may be removed from the product by heating above 40° C. under reduced pressure, or it may be left in the product in order to reduce the melting point thereof, which may be advantageous in facilitating incorporation in vinyl resins as a stabiliser.

The invention is illustrated by the following examples:

EXAMPLE 1

Dibutyl tin oxide (248 pts.) and maleic anhydride (98 pts.) were mixed together and then passed through a pin mill to ensure intimate mixing. The mixture was then heated at 40° C. for 12 hours so as to form dibutyl tin maleate in quantitative yield as a white powder, melting point 134° C.

EXAMPLE 2

Dibutyl tin oxide (248 pts.) and maleic anhydride (130 pts.) were mixed together as described in Example 1. The resulting mixture was heated at 50° C. under a slight vacuum to sublime off the excess maleic anhydride. The resulting solid was dibutyl tin maleate, melting point 134° C.

EXAMPLE 3

Dibutyl tin oxide (248 pts.) and maleic anhydride (115 pts.) were mixed together as previously described and the mixture heated at 40° C. for 12 hours. The resulting product was substantially dibutyl tin maleate contaminated with some maleic anhydride and had melting point 113° C. By variation of the excess maleic anhydride in this example products could be formed having a range of melting points from 95°–134° C.

What is claimed is:

1. A method of preparing dibutyl tin maleate, comprising grinding together one molar proportion of dibutyl tin oxide and from one to one and one-third molar proportions of maleic anhydride and heating for up to 24 hours at a temperature of less than 40° C.

References Cited

UNITED STATES PATENTS 2,838,554 6/1958 Gloskey ---------- 260—429.7
3,037,040 5/1962 Anderson et al. ----- 260—429.7

TOBIAS E. LEVOW, *Primary Examiner.*

W. F. W. BELLAMY, *Assistant Examiner.*